(12) United States Patent
Fontaine

(10) Patent No.: US 7,346,344 B2
(45) Date of Patent: Mar. 18, 2008

(54) IDENTITY-BASED WIRELESS DEVICE CONFIGURATION

(75) Inventor: Jean-Emmanuel Fontaine, Vienna, VA (US)

(73) Assignee: AOL LLC, a Delaware Limited Liability Company, Dulles, VA (US)

(*) Notice: Subject to any disclaimer, the term of this patent is extended or adjusted under 35 U.S.C. 154(b) by 302 days.

(21) Appl. No.: 10/448,326

(22) Filed: May 30, 2003

(65) Prior Publication Data

US 2004/0242197 A1 Dec. 2, 2004

(51) Int. Cl.
*H04M 3/00* (2006.01)
(52) U.S. Cl. .................. 455/418; 455/419; 455/432.3; 370/338; 709/220; 709/221
(58) Field of Classification Search ................ 455/418, 455/419, 435.1–435.3, 436.3, 426.1, 410–411, 455/456.1–456.6, 432.1–432.3; 709/217–223; 717/160–178; 370/338
See application file for complete search history.

(56) References Cited

U.S. PATENT DOCUMENTS

| | | | |
|---|---|---|---|
| 5,826,000 A | 10/1998 | Hamilton | |
| 5,852,722 A | 12/1998 | Hamilton | |
| 5,943,619 A * | 8/1999 | Coyne et al. | 455/433 |
| 6,314,459 B1 | 11/2001 | Freeman | |
| 6,744,753 B2 | 6/2004 | Heinonen et al. | |
| 6,885,859 B2 * | 4/2005 | Karaoguz et al. | 455/408 |
| 6,892,309 B2 * | 5/2005 | Richmond et al. | 726/7 |
| 6,909,891 B2 * | 6/2005 | Yamashita et al. | 455/420 |
| 6,934,391 B1 * | 8/2005 | Linkola et al. | 380/247 |
| 2001/0031621 A1 * | 10/2001 | Schmutz | 455/7 |
| 2002/0059434 A1 | 5/2002 | Karaoguz et al. | |
| 2003/0027581 A1 * | 2/2003 | Jokinen et al. | 455/456 |
| 2003/0220091 A1 | 11/2003 | Farrand et al. | |
| 2004/0250273 A1 | 12/2004 | Swix et al. | |
| 2004/0261112 A1 | 12/2004 | Hicks, III et al. | |

FOREIGN PATENT DOCUMENTS

WO  WO 01/22661 A2  3/2001

OTHER PUBLICATIONS

Alexander, S. and Droms, R., "DHCP Options and BOOTP Vendor Extensions (Request for Comments: 2132)", The Internet Engineering Task Force, Mar. 1997, pp. 1-32.

Catrina, Octavian; Thaler, Dave; Aboba, Bernard; and Guttman, Erik, "Zeroconf Multicast Address Allocation Protocol (ZMAAP) (Internet Draft)," Internet Engineering Task Force, Oct. 22, 2002, pp. 1-15.

(Continued)

*Primary Examiner*—George Eng
*Assistant Examiner*—Marcos L. Torres
(74) *Attorney, Agent, or Firm*—Fish & Richardson P.C.

(57) ABSTRACT

Techniques are provided for the relating identity information with wireless configuration information for a wireless device or a wireless network. A trusted system may be used to generate wireless configuration parameters for a wireless network based on identity information. The identity-based wireless configuration information may be stored on the trusted system remote to the wireless network and accessible to the wireless device. The wireless configuration may be migrated from the trusted system to the wireless device.

75 Claims, 4 Drawing Sheets

OTHER PUBLICATIONS

Cheshire, Stuart; Aboba, Bernard; and Guttman, Erik, "Dynamic Configuration of IPv4 Link-Local Addresses (Internet Draft)" Internet Engineering Task Force, Aug. 23, 2002, pp. 1-29.

Cheshire, Stuart, "IPv4 Address Conflict Detection (Internet Draft)," Internet Engineering Task Force, Dec. 9, 2002, pp. 1-12.

Guttman, Erik, "Zeroconf Host Profile Applicability Statement (Internet Draft)," Internet Engineering Task Force, Jul. 20, 2001, pp. 1-10.

Guttman, Erik, "Autoconfiguration for IP Networking: Enabling Local Communication," *IEEE Internet Computing*, May-Jun. 2001, pp. 81-86.

Guttman, Erik, "An API for the Zeroconf Multicast Address Allocation Protocol (ZMAPP) (Internet Draft)," Internet Engineering Task Force, Jun. 6, 2001, pp. 1-12.

Williams, A., "Requirements for Automatic Configuration of IP Hosts (Internet Draft)," Internet Engineering Task Force, Sep. 19, 2002, pp. 1-21.

* cited by examiner

IDENTITY-BASED WIRELESS DEVICE CONFIGURATION

TECHNICAL FIELD

This description relates to the configuration of a wireless device.

BACKGROUND

In a network of computing devices, a device on the network may be configured with particular information that enables communications with the other devices on the network. When a network includes wireless communications, the wireless devices and the wireless access points that connect the wireless devices to the network may be configured to communicate using a common set of wireless parameters or settings. This configuration process may require the entry of several sets of alphanumeric strings. To enable access by mobile wireless devices to two or more wireless networks, the wireless devices typically are configured to use wireless parameters appropriate for each of the networks.

SUMMARY

In one general aspect, configuring a wireless device includes obtaining an identity associated with a user of a device. Wireless configuration information based on the obtained identity is determined. The configuration of at least one of a wireless device and a wireless network based on the determined wireless configuration information is enabled.

Implementations may include one or more of the following features. For example, the device may be the same device as the wireless device, or may be a different device than the wireless device. The obtained identity associated with the user may be an identity associated with a user of a wireless device. Determining wireless configuration information may include accessing wireless configuration information based on the obtained identity. The user identity may be obtained from a storage location that is remote to the device used by the user. Wireless configuration information may be generated based on the obtained identity. A network identity may be generated. The obtained identity may be authenticated to determine whether the obtained identity is authorized to access a trusted system. Wireless configuration information may be generated and stored only when the received identity is authorized to access the trusted system. The generated wireless configuration information may be stored, and the generated wireless configuration may be stored at a storage location that is both remote to the wireless device and remote to a gateway associated with the wireless network.

Enabling configuration may include enabling the configuration of a wireless device for use with both the wireless network and the second wireless network. Enabling configuration also may include a wireless network with settings that are substantially the same as a second wireless network, and the second wireless network may be available for wireless connectivity concurrently with the wireless network for which configuration is enabled.

The trusted system may include a system provided by an Internet service provider or a system provided by an Internet access provider. The wireless configuration information may include a connectivity parameter. The identity may be a user identity or a network identity. The network identity may include one or more of a network name, a service set identifier, a media access control address, or a network address.

Generating wireless configuration information may include generating a network identity. A communications session between the wireless device and a trusted system may be established, as may a communications session between a gateway for the wireless network and the trusted system. The obtained wireless configuration information may be communicated between the wireless device and the trusted system.

In another general aspect, generating wireless configuration information includes identifying an identity associated with a device. The wireless configuration information is generated based on the identified identity. A wireless device is enabled to use the generated wireless configuration information.

Implementations may include one or more of the features noted above.

Implementations of the techniques discussed above may include a method or process, an apparatus or system, or computer software on a computer-accessible medium.

The details of one or more implementations set forth in the accompanying drawings and the description below. Other features will be apparent from the description and drawings, and from the claims.

DETAILED DESCRIPTION

Techniques are provided for configuring one or more wireless devices to use a wireless network. The wireless configuration information for a wireless network may be stored on a trusted system that is accessible to the wireless device. The wireless configuration information may be associated with a particular user identity. The wireless configuration then may be migrated from the trusted system to any wireless device when the wireless device accesses the trusted systems such that communications based on the migrated wireless configuration will be enabled by the accessing wireless device with or using the wireless network. The wireless device may be, for example, a wireless mobile device or a home-networking gateway capable of wireless communication. The trusted system is trusted by the wireless device and network, and the trusted system may be used to generate wireless configuration information, such as a network name, for the wireless network.

The techniques use an identity, such as a user name, as the basis for the configuration of a wireless network and wireless devices. Examples of an identity include a user name, a network identity, a street address of a user, or another type of information that may be used to generate a unique configuration parameter. Wireless configuration information is stored at a trusted system to enable the configuration of wireless end-user devices seeking to communicate with the wireless network. The wireless configuration information stored at the trusted system also may enable the configuration of subsequent wireless networks with configuration settings that are the same or similar as an different wireless network. This may enable access by a mobile device, such as a PDA or laptop computer, to more than one currently existing wireless network without requiring the reconfiguration of the mobile device.

Figure 1:
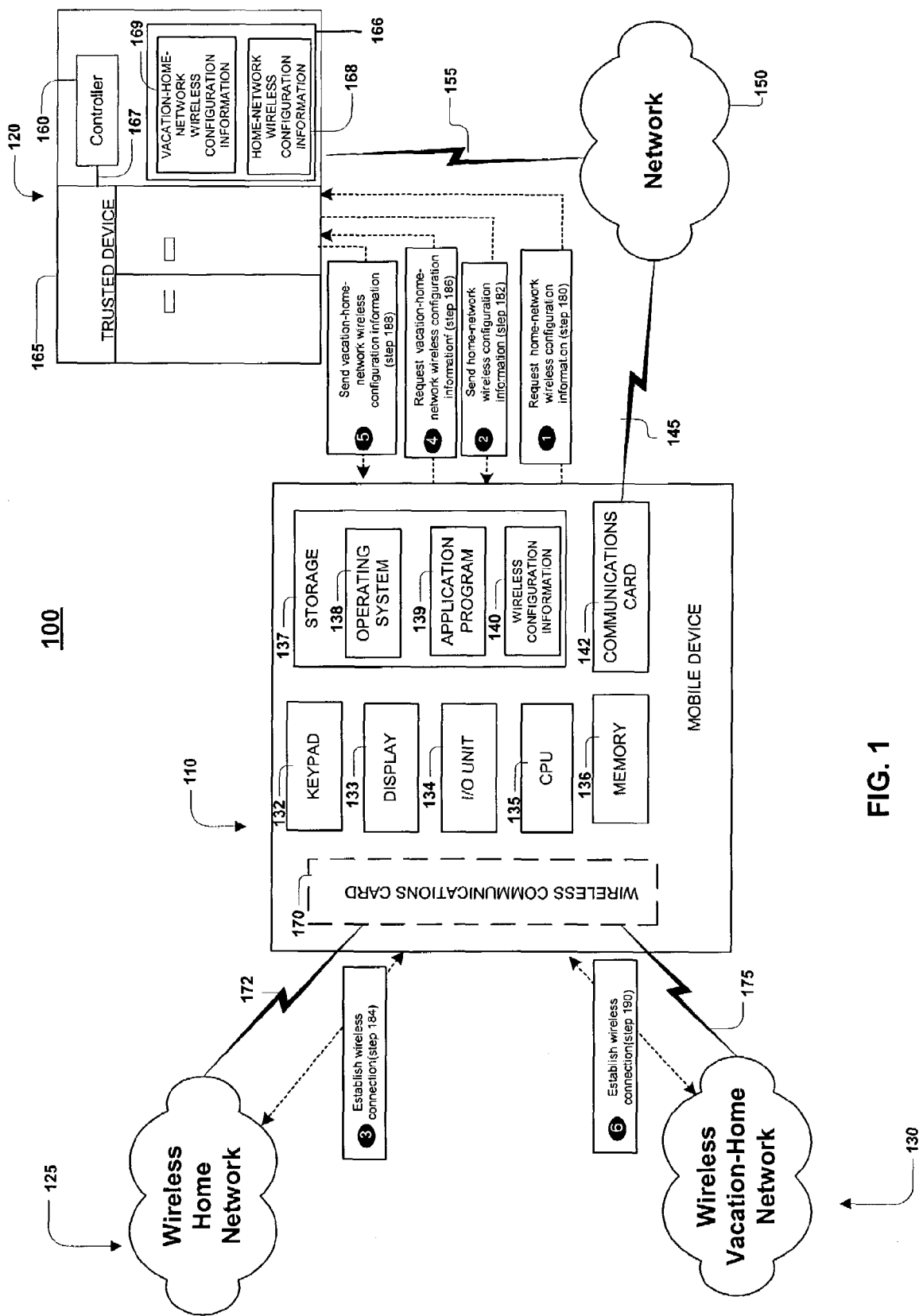
FIGS. 1 and 2 are block diagrams illustrating exemplary communications systems capable of configuring devices used in a wireless network.

Referring to FIG. 1, a communications system 100 is capable of delivering and exchanging data between a mobile device 110 and a trusted system 120, a wireless home network 125, or a wireless vacation-home network 130. The mobile device 110 includes a keypad, a keyboard or another type of input device 132 (collectively, "keypad"), a display 133, an I/O unit 134, a central processing unit (CPU) 135, a memory 136, and a data storage device 137. The data storage device 137 may store machine-executable instructions, data, and various computer programs, such as an operating system 138 and one or more application programs 139, for implementing a process for configuring a wireless device, all of which may be processed by CPU 135. Each computer program may be implemented in a high-level procedural or object-oriented programming language, or in assembly or machine language if desired. The language may be a compiled or interpreted language.

The data storage device 137 also may store wireless configuration information 140. The wireless configuration information 140 may include protocol information necessary to configure the mobile device 110 to communicate with a wireless network, such as the wireless home network 125 or the wireless vacation-home network 130. The wireless configuration information 140 stored on the mobile device 110 may include a wireless network name, such as a service set identifier (SSID), that identifies the particular network. The wireless configuration information 140 also may include security information, such as a cryptographic key that may be used to encrypt and decrypt transmitted data, a level of encryption (e.g., 40-bit encryption or 128-bit encryption) associated with a cryptographic key, or another type of security parameter that is specified by a security scheme. Examples of a security scheme include (but are not limited to) wired equivalent privacy (WEP), WiFi Protected Access (WAP), and 802.11i. The storage of such wireless configuration information may be useful for the mobile device 110 that must maintain common configuration information with a wireless access point of the wireless home network 125 (or the wireless vacation-home network 130) to enable communications with the wireless access point, and thus, the wireless home network 125 or the wireless vacation-home network 130. For instance, the mobile device 110 and a wireless access point may be required to maintain the following configuration information in common to enable them to communicate: a cryptographic key, a SSID, a list of devices that are permitted access, and a level of encryption associated with the cryptographic key.

The data storage device 137 may be any form of non-volatile memory, including, for example, semiconductor memory devices, such as Erasable Programmable Read-Only Memory (EPROM), Electrically Erasable Programmable Read-Only Memory (EEPROM), and flash memory devices; magnetic disks, such as internal hard disks and removable disks; magneto-optical disks; and Compact Disc Read-Only Memory (CD-ROM).

The mobile device 110 also may include a communications card or device 142 (e.g., a modem and/or a network adapter) for exchanging data using a communications link 145 (e.g., a telephone line, a wireless network link, a wired network link, or a cable network) with a network 150. Examples of the network 150 include the Internet, the World Wide Web, WANs, LANs, analog or digital wired and wireless telephone networks (e.g., ISDN ("Integrated Services Digital Network") and DSL ("Digital Subscriber Line"), including various forms of DSL such as SDSL ("Single-line Digital Subscriber Line"), ADSL ("Asymmetric Digital Subscriber Loop), HDSL ("High bit-rate Digital Subscriber Line"), and VDSL ("Very high bit-rate Digital Subscriber Line")), radio, television, cable, satellite, and/or any other delivery mechanism for carrying data.

The mobile device 110 may use communications links 145 and 155 and the network 150 to communicate with the trusted system 120. As shown, the mobile communications device 110 may be, for example, a mobile telephone, a pager, a personal digital assistant ("PDA"), or a portable personal communicator.

The trusted system 120 is generally capable of executing instructions under the command of a trusted controller 160. The trusted device 165 is connected to the trusted controller 160 by a wired or wireless data pathway 167 that is capable of delivering data.

The trusted device 165 and the trusted controller 160 each typically include one or more hardware components and software components. An example of a trusted device 165 is a general-purpose computer (e.g., a personal computer) capable of responding to and executing instructions in a defined manner. Other examples include a special-purpose computer, a workstation, a server, a device, a component, other physical or virtual equipment, or some combination thereof capable of responding to and executing instructions. The trusted device also may be a host system of an Internet access provider or an Internet service provider.

An example of a trusted controller 160 is a software application loaded on the trusted device 165 for commanding and directing communications enabled by trusted device 165. Other examples include a program, a piece of code, an instruction, a device, a computer, a computer system, or a combination thereof, for independently or collectively instructing the trusted device 165 to interact and operate as described. The trusted controller 160 may be embodied permanently or temporarily in any type of machine, component, physical or virtual equipment, storage medium, or propagated signal capable of providing instructions to the trusted device 165.

The trusted system 120 may store wireless configuration information 166, including home-network wireless configuration information 168 and vacation-home network wireless configuration information 169. The home network wireless configuration information 168 includes the wireless configuration information necessary to access the wireless home network 125. Similarly, the vacation-home network wireless configuration information 169 includes the wireless configuration information necessary to access the wireless vacation-home network 130. The home or vacation-home network wireless configuration information 168 or 169 may be associated with a user identity. Examples of a user identity include a user name, an account name, a supervisory account name, or another type of user identifier.

The mobile device 110 may use a wireless communications card 170 to communicate over wireless communications links 172 and 175 to the wireless home network 125 and the wireless vacation-home network 130, respectively. When the trusted system 120 may be accessed wirelessly by the mobile device 110, a single wireless communications card 170 may function as communications card 145 and communications card 170. To communicate with the wireless home network 125, the wireless configuration information 140 on the mobile device 110 must be configured consistently with corresponding wireless configuration information on the wireless home network 125. Similarly, to communicate with the wireless vacation-home network 130, the wireless configuration information 140 must be configured consistently with wireless configuration information on the wireless home network 125.

To establish wireless communication between the mobile device 110 and the wireless home network 125, the mobile device 110 sends a request for home network wireless configuration information to the trusted system 120 using communications links 145 and 155 and the network 150 (step 180). The request may include a user identity associated with the requested home network wireless configuration information.

The trusted system 120 accesses the stored home network wireless configuration information 168 based on the user identity included in the request (step 182). The trusted system 165 then sends the accessed home network wireless configuration information 168 to the mobile device 110 using communications links 145 and 155 and the network 150.

The mobile device 110 updates the wireless configuration information 140 with the received home network wireless configuration information (not shown). Using the updated wireless configuration information 140, the mobile device 110 establishes a wireless connection 170 with the wireless home network 125 (step 184).

Similarly, to establish wireless communication between the mobile device 110 and the wireless vacation-home network 130, the mobile device 110 sends a request for vacation-home network wireless configuration information to the trusted system 120 using communications links 145 and 155 and the network 150 (step 186). The request may include a user identity associated with the requested vacation-home network wireless configuration information.

The trusted system 120 accesses the stored vacation-home network wireless configuration information 169 based on the user identity included in the request, and sends the accessed information 169 to the mobile device 110 (step 188).

The mobile device 110 updates the wireless configuration information 140 with the received vacation-home network wireless configuration information. Using the updated wireless configuration information 140, the mobile device 110 establishes a wireless connection 175 with the wireless vacation-home network 130 (step 190).

The trusted system 120 may be configured to use the user identity to generate a network name or network identifier for a wireless network, such as the wireless home network 125 or the wireless vacation-home network 130. The automatic generation of a network name or network identifier based on a user identity may be advantageous. For example, the burden of the user of determining a suitable network name or network identifier may be reduced or eliminated. The generation of unique network names across multiple wireless networks operating in the same region, such as in a multi-dwelling unit environment, may be aided by the generation of a network name based on a identifier that is unique to a trusted system. This may be particularly true when many of the users of the multiple wireless networks operating in a region also are users of the same trusted system, as may be the case when the trusted system is a locally or nationally prominent Internet service or access provider.

One area where the techniques may find specific applicability is in the configuration of wireless devices, such as a mobile device or a gateway capable of wireless communication, to use the same wireless parameters for wireless networks in different locations. For example, a laptop computer may be configured to use wireless configuration parameters for a vacation-home wireless network based on the wireless configuration of the user's home network. For example, a user may have configured a vacation-home wireless network to operate with wireless configuration information stored on a trusted system. When the user visits or returns to the vacation-home with a laptop computer configured to operate on the user's home wireless network, they may wish to use the laptop computer with the vacation-home wireless network. If configuration information is not available at the user's laptop computer for accessing the vacation-home wireless network, the user may obtain such configuration information by establishing a wired connection (e.g., using a dial-up connection or a wired broadband connection) between the laptop computer and a trusted system, such as an Internet access provider or Internet service provider. The user accesses the trusted system using the laptop computer and connects to a wireless configuration service on the trusted system. For example, the user may select a function to download wireless home network parameters from a menu of services available from the trusted system. The trusted system identifies the appropriate wireless vacation-home network parameters for download based on the identity of the user. The wireless configuration parameters for the wireless vacation-home network are downloaded to the laptop computer from the trusted system, and the laptop computer is configured for use with the vacation-home wireless network. The user is then able to use the laptop computer to connect to the vacation-home wireless network.

In another example, a small business may have several offices and each office may be geographically dispersed from the other offices. Each office may include a wireless network that is separate from the other offices. The small business may wish to configure each of the wireless networks to use the same wireless configuration information. These techniques may permit the wireless networks to be configured using the same wireless configuration information when the wireless configuration is entered by a user only once. To accomplish this, wireless configuration information for a wireless network is stored on a trusted system. The wireless configuration information includes a network name based on unique identity information and generated by the trusted system. To configure a gateway for a second wireless network, a user accesses, on the trusted system, the wireless configuration information for the first wireless network that is associated with the user. The wireless configuration information on the trusted system is downloaded to the gateway for the second wireless network. The second wireless network is configured with the wireless configuration from the trusted system. Thus, a user with a laptop computer that is configured to operate on the wireless network at one office location also is able to access the wireless network at the second office location. This may be accomplished without requiring the user to reconfigure the wireless configuration information of the laptop computer and without requiring a user to enter wireless configuration information for the second wireless network.

Figure 2:
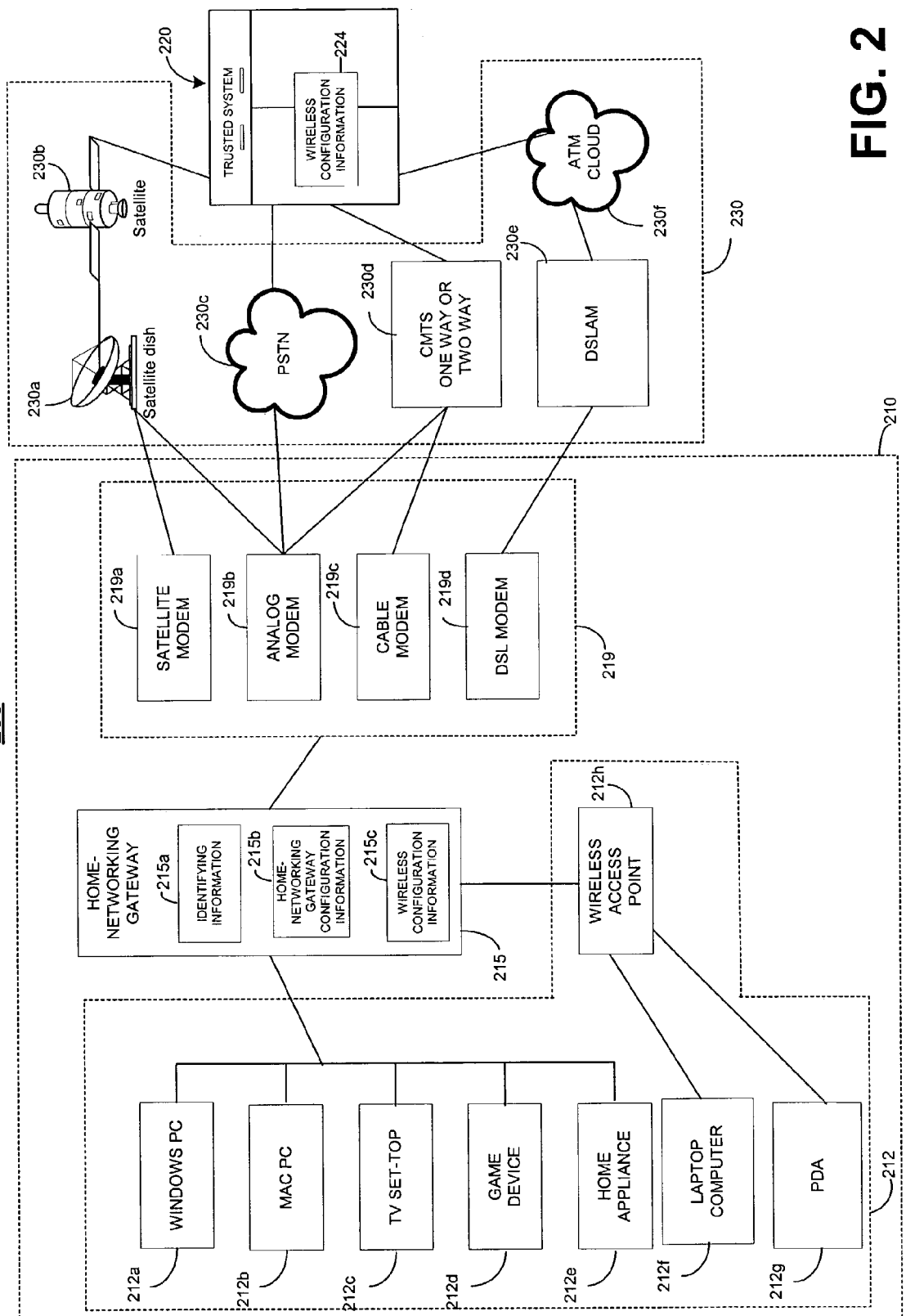

Referring to FIG. 2, a communications system 200 includes a home network 210 having multiple home-networked devices 212 connected to each other and to a home-networking gateway 215. Some of the devices 212 are wireless devices. The home network 210 may be an example implementation of the wireless home network 125 of FIG. 1.

The communications system 200 enables the devices 212 to communicate with a trusted system 220 through a home-networking gateway 215 using a single communication device 219. The devices 212, the home-networking gateway 215, and the communication device 219 may be included in a home network 210 physically located in a personal residence (e.g., a single-family dwelling, a house, a townhouse, an apartment, or a condominium). However, the location of the home-networking gateway 215 in the personal residence does not necessarily preclude one or more of the devices 212 from being networked to the home-networking gateway 215 from a remote location. Similarly, the location of the home-networking gateway in the personal residence does not necessarily preclude use of one or more of the devices 212 from outside of the personal residence or communication by those devices with the trusted system 220 through the home-networking gateway 215. For instance, the devices 212 may include one or more portable computing devices that may be taken outside of the personal residence and still remain connected through a wireless access point to the home-networking gateway 215 located within the personal residence.

The home-networking gateway 215 is located logically between the devices 212 and a trusted system 220 that is external to the home network 210. The trusted system 220 may be, for example, the trusted system 120 of FIG. 1, an Internet access provider device, an Internet service provider device, an online trusted system proxy server, or another external system device.

The devices 212 may include one or more general-purpose computers (e.g., personal computers), one or more special-purpose computers (e.g., devices specifically programmed to communicate with the home-networking gateway 215 and/or the trusted system 220), or a combination of one or more general-purpose computers and one or more special-purpose computers. Other examples of devices 212 include a workstation, a server, an appliance (e.g., a refrigerator, a microwave, or an oven), an intelligent household device (e.g., a thermostat, a security system, a heating, a ventilation and air conditioning (HVAC) system, or a stereo system), a device, a component, other physical or virtual equipment, or some combination of these elements capable of responding to and executing instructions in compliance with the system architecture.

As illustrated by FIG. 2, examples of devices 212 may include, but are not limited to, a personal computer with a Windows™ OS 212a, a Macintosh™ personal computer 212b, a TV set-top box 212c, a game device 212d, a home appliance 212e, a laptop or otherwise portable computer 212f, a personal digital assistant (PDA) 212g, and a wireless access point (WAP) 212h. Some of the devices, such as a personal computer with Windows™ OS 212a, a Macintosh™ personal computer 212b, a TV set-top box 212c, a game device 212d, and a home appliance 212e, communicate with the home-networking gateway 215 through a wired network.

Some of the other devices, such as a laptop computer 212f and a PDA 212g, typically communicate with the home-networking gateway 215 using a wireless access point 212h. When devices communicate using wireless access point 212h, they may be referred to as wireless devices. Wireless devices maybe portable or fixed devices. For example, in another implementation, a desktop personal computer, such as a personal computer with a Windows™ OS 212a or a Macintosh™ personal computer 212b, may communicate using wireless access point 212h. Typically, the wireless access point 212h is connected to home-networking gateway 215 through the wired network, such that the wireless access point 212h transmits to the home-networking gateway 215 communications received over a wireless communications pathway from wireless devices. In another implementation, a wireless access point may be included in the home-networking gateway.

A wireless communications pathway may use various protocols to support communications between a wireless device and a wireless access point 212h. For example, the wireless communications pathway may use wireless technology based on the Institute of Electrical and Electronics Engineers, Inc. (IEEE) 802.11 standard (such as 802.11b, 802.11a or 802.11g). The wireless communications pathway also may use wireless technology based on the Bluetooth approach for short range wireless communications, other personal area network (PAN) technologies, or other wireless technology, such as the HiperLan2 standard by the European Telecommunications Standards Institute (ETSI).

Some of the devices 212, such as a personal computer with Windows™ OS 212a, a Macintosh™ personal computer 212b, a laptop computer 212f, and a PDA 212g, include software for logging on to the trusted system 220 using a particular client application that is associated with, or that identifies, the user of the device. Such devices may be referred to as client devices. Other devices, such as home appliance 212g, may include software for logging on to trusted system 220 without identifying an associated user of the device. Yet other devices, such as TV set-top 212c and game device 212d, may be configured to function either as a client device or a non-client device depending on the function being performed.

FIG. 2 shows several implementations and possible combinations of devices and systems used within the home networking system 200. For brevity, only a few illustrative elements are included in home networking system 200.

The home-networking gateway 215 may include a home gateway device, such as a gateway, a router, or another communication device. The home-networking gateway 215 also may include a digital hub capable of receiving broadcast video signals, receiving communication data (such as through a broadband connection), and distributing the signals and data to devices 212. The home-networking gateway 215 may include another communications device and/or a home entertainment device, such as a stereo system, a radio tuner, a TV tuner, a portable music player, a personal video recorder, and a gaming device. The home-networking gateway 215 may communicate with the trusted system 220 over communications links 230, which generally are accessed using a communication device 219.

Examples of the communication device 219 may include (but are not limited to) a satellite modem 219a, an analog modem 219b, a cable modem 219c, and a DSL modem 219d. The home-networking gateway 215 uses the communication device 219 to communicate with the trusted system 220 through communication links 230.

The communication links 230 may include various types of communication delivery systems that correspond to the type of communication device 219 being used. For example, if the home-networking gateway 215 includes a satellite modem 219a, then the communications from a device 212 and an associated home-networking gateway 215 may be delivered to the trusted system 220 using a satellite dish 230a and a satellite 230b. The analog modem 219b may use one of several communications links 219, such as the satellite dish 230a and satellite 230b, the Public Switched Telephone Network (PSTN) 230c (which also may be referred to as the Plain Old Telephone Service or POTS), and the Cable Modem Termination System (CMTS) 230d. The cable modem 219c typically uses the CMTS 230d to deliver and receive communications from the trusted system 220. The DSL modem 219d typically delivers and receives communications with the trusted system 220 through a Digital Subscriber Line Access Multiplexer (DSLAM) 230e and an Asynchronous Transfer Mode (ATM) network 230f.

The home networking system 200 may use various protocols to communicate between the devices 212 and the home-networking gateway 215 and between the home-networking gateway 215 and the trusted system 220. For example, a first protocol may be used to communicate between the devices 212 and the home-networking gateway 215, and a second protocol may be used to communicate between the home-networking gateway 215 and the trusted system 220, where the first protocol and the second protocol may be the same or different protocols. As such, the home-networking gateway 215 may include different hardware and/or software modules to implement different home networking system protocols.

The home-networking gateway 215 may include identifying information 215a, such as a MAC ("Media Access Control") address and/or a network address, that may uniquely identify a home-networking gateway 215. The identifying information 215a also may include an identifier or a name assigned by the trusted system 220.

The home-networking gateway also may store home-network gateway configuration information 215b and wireless configuration information 215c. Home-networking gateway configuration information 215b may be stored in a table or a list on the home-networking gateway 215. The configuration information 215b may be associated with identifying information 215a for the home-networking gateway 215 and/or a user account that is permitted access to the trusted system 220.

The home-networking gateway configuration information 215b also may include device information for devices 212 associated with the home-network 210. Device information may include a device identifier for a device, such as one of devices 212a-212h. The device identifier may include a hardware device identifier, such as a MAC address, a unique serial number, and/or a network address, such as a static IP address associated with the device or a dynamic IP address. The dynamic IP address may be assigned by home-networking gateway 215, by some other network device, or by the trusted system 220 through the Dynamic Host Configuration Protocol (DHCP) or another protocol that enables the dynamic allocation of an IP address to a device on a network.

The device information associated with each device also may include, for example, the type of device (e.g., a client or a non-client device), the class of device (e.g., a gaming device, a personal computer, or a PDA), the type of platform (e.g., the type of hardware, such as a Macintosh™ personal computer, a Windows™-based personal computer, a PDA, a home appliance, or an entertainment device), and/or the operating environment (e.g., the operating system type and/or version).

In addition, the device information may include a user-assigned name. The user-assigned name may be referred to as a familiar name or a nickname. For example, an identifier for a particular game device may be associated with the user-assigned name of "Billy's game device." The device information also may include parental control information or other types of access restrictions that are associated with the device.

The home-networking gateway configuration information 215b may include protocol information necessary to configure the home-networking gateway 215 to communicate with devices 212, such as information describing how to establish communication with one or more of devices 212, how to configure the wireless access point 212h, or how to configure wireless devices, such as the laptop computer 212f or the PDA 212g.

The wireless configuration information 215c may be stored in a table or a list on the home-networking gateway 215. The wireless configuration information 215c may include security information, such as a cryptographic key and level of encryption, and a wireless network name, such as a service set identifier (SSID) that identifies the particular network. The wireless configuration information 215c may include a list of devices that are permitted access to the home network. For example, the wireless configuration information 215c may include a list of MAC addresses that uniquely identify the devices that are permitted access to the home network.

The storage of wireless configuration information 215c may be particularly useful for a wireless device, such as laptop computer 212f that must maintain common or at least consistent configuration information with a wireless access point to enable communications with the wireless access point. For instance, a wireless device and a wireless access point may be required to maintain/store the following configuration information in common to enable them to communicate: a cryptographic key, a SSID, a list of devices that are permitted access, and a level of encryption associated with the cryptographic key.

Additionally or alternatively, the home-networking gateway 215 may communicate with devices using only a wireless communications pathway. In other implementations, the home-networking gateway 215 may communicate with devices using only a wired communications pathway. Additionally or alternatively, the home-networking gateway 215 may include one or more communications devices 219 and/or one or more devices 212.

The laptop computer 212f may connect to the trusted system 220 using, for example, an analog modem to communicate over the PSTN 230c or may connect to the trusted system 220 using the home-networking gateway 215. The trusted system 220 sends wireless configuration information 224 to the laptop computer 112f to enable the laptop computer 212f to communicate with the home network 210 using the wireless access point 212h. The sending of wireless configuration information also may be referred to as migration of wireless configuration information.

The home-networking gateway 215 communicates the wireless configuration information 215c with the trusted system 220 using the communication device 219. The trusted system 220 stores the received wireless configuration information 215c as configuration information 224, and may associate the configuration information 224 with a particular user account or an unique identifier for an identity.

The ability of a trusted system 220 to store and communicate the wireless configuration information for a wireless network to a wireless device may be particularly useful in automating and/or simplifying the process used to configure a wireless device to work on a wireless network. By enabling a transfer of configuration information from the trusted system to the wireless device, configuration information may be transferred to different networking gateways and used to enable the different networking gateways and/or a wireless device or devices to be automatically configured for wireless communications. This may relieve a user of the burden of manually configuring the wireless device.

For example, a user may have a wireless network at the user's primary residence and a different wireless network at the user's vacation home. The user may wish to configure the vacation-home wireless network using the wireless configuration information for the user's primary-residence home network. To do so, the wireless configuration information for the primary-residence home wireless network may be stored on the trusted system and communicated to the vacation-home wireless network. For example, the user may send the wireless configuration from the home-networking gateway of the primary-residence home network to the trusted system. Subsequently, the user may retrieve the wireless configuration from the trusted system to configure the vacation-home wireless network. The user may retrieve the wireless configuration information from the trusted system, for example, by using a wired connection between the home-networking gateway on the vacation-home wireless network and the trusted system. This may occur without requiring user manipulation. For example, when a user accesses the trusted system using a computer connected through a home-networking gateway at the vacation-home, the trusted system may send the wireless configuration information associated with the primary residence home-networking gateway to the home-networking gateway at the vacation home, and, thus, enable access to the wireless network by a wireless device configured for use with the wireless network at the primary residence. Alternatively, the user who wishes to access the vacation-home wireless network may retrieve the wireless configuration information from the trusted system by using a mobile computer to connect with the trusted system, for example, as described previously with the respect to FIG. 1. The retrieved wireless configuration information then is used to configure the vacation-home wireless network.

The ability to replicate wireless configuration information from one wireless network to a different wireless network may relieve a user from the burden of entering wireless configuration information for the wireless network. This may be particularly advantageous when the wireless configuration information to be entered is cumbersome, such as when several sets of alphanumeric strings are required.

The trusted system 220 may be configured to generate a network name, such as a SSID, to enable wireless devices to interconnect using the wireless network. The trusted system 220 generates a network name based on a user identity in response to a request sent from the home-networking gateway 215. The identity used in the generation of the network name may be a user identity that is authorized to access the trusted system 220. For example, the user identity may include a user name or an account name that is associated with the home-networking gateway 215. The user identity also may include a user name or an account name associated with one of the devices 212 that is connected to the trusted system 220 through the home-networking gateway 215.

The generation of a network name or another type of wireless connectivity parameter based on a user identity may be beneficial. For example, the generation of a network name on a user account name may simplify the discovery and registering of wireless networks and wireless devices. Furthermore, using a trusted system to generate a network name based on a user identity may be particularly advantageous, relieving a user of performing the burdensome process of identifying and remembering an appropriate network name. The use of a trusted system also may provide an increased level of security for the wireless network by generating a network name based on an authenticated user identity. In some cases, a user may be discouraged by the prospect of generating a memorable, unique network name and may therefore avoid modifying a default network name for a gateway provided by the manufacturer. The user's continued use of default wireless configuration information may reduce the security provided by the wireless network because the default wireless configuration information may be generally known, such as when a manufacturer uses the same default network name for all devices that the manufacturer sells. The ability of a trusted system to generate a network name based on user identity information may encourage a user to modify the default network name when the user otherwise would not do so.

Figure 3:
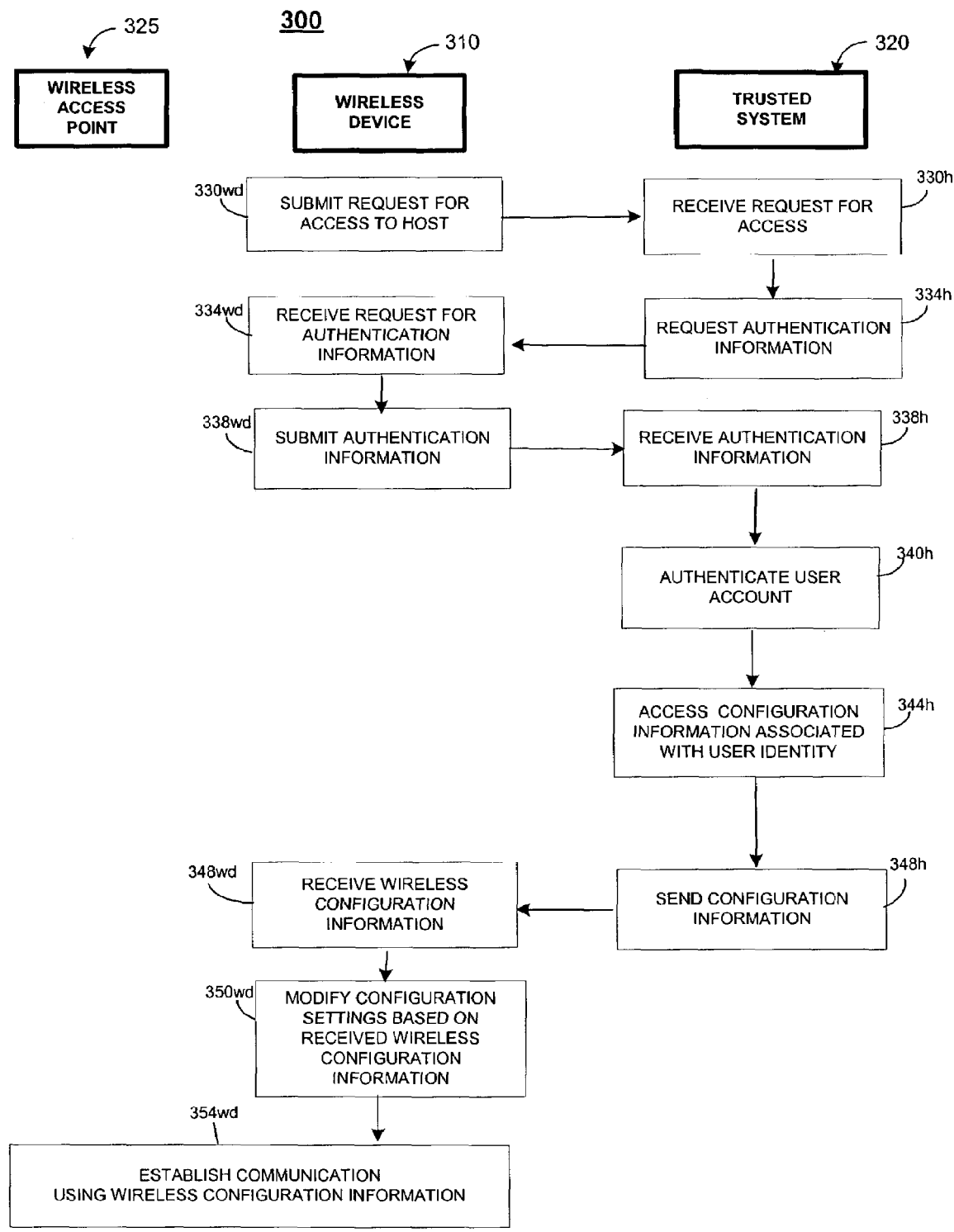
FIG. 3 is a block diagram illustrating exemplary communications between a wireless device, a wireless access point, and a trusted system to configure the wireless device.

FIG. 3 shows an exemplary process 300 that configures a wireless device 310 to communicate with a wireless network using wireless configuration information retrieved from a trusted system 320. The wireless configuration information may be retrieved from storage on the trusted system 320, where the wireless configuration information is associated with a user identity and enables wireless communication with wireless access point 325.

The wireless device 310 may be, for example, a laptop computer 212f or a PDA 212g described previously with respect to FIG. 2. The trusted system 320 may be an implementation of the trusted system 120 of FIG. 1 or the trusted system 220 of FIG. 2. The wireless access point 325 may be an implementation of the wireless access point 212h of FIG. 2 or a home-networking gateway that includes a wireless access point. In some implementations, a wireless access point, a wireless device, or another type of device may perform the roles described as being associated with the wireless access point 325.

The process 300 begins when the wireless device 310 submits a request for access to the trusted system 320 (step 330wd). The wireless device 310 submits the request for access to the trusted system using a wired or wireless network other than the network for which the wireless device 310 is being configured. For example, referring to FIG. 1, a wireless mobile device 110 may use network 150 to access the trusted system 120 to configure the wireless mobile device 110 to communicate using the wireless home network 125 or the wireless vacation-home network 130.

The trusted system 320 receives the request for access (step 330h) and requests authentication information (step 334h).

The wireless device 310 receives the request for authentication information (step 334wd) and submits authentication information (step 338wd). For example, the wireless device 310 may submit a user or screen name and a password or other authenticating information.

The trusted system 320 receives the authentication information (step 338h) and authenticates the user account of the wireless device 310 (step 340h). If the trusted system 320 determines that the user account associated with the wireless device 310 is not authenticated, the trusted system may take any of several actions (not shown), including terminating the session immediately, sending a message to the wireless device 310, or sending a message to a master, family or supervisory account associated with the home-networking gateway 315.

When the trusted system 320 determines that the user associated with the wireless device 310 is an authenticated user, the trusted system 320 accesses wireless configuration information (step 344h). For example, the trusted system 320 may access wireless configuration information 324, as described previously with respect to the trusted system 320 of FIG. 3. The accessed wireless configuration information may include, for example, a cryptographic key, a network name (such as a SSID), a list of devices permitted to access the network, and other information needed to configure the device to work on the wireless home network, examples of which are described with respect to FIG. 1. When more than one set of wireless configuration information is associated with an identity, the trusted system 320 may present a list of a portion of the sets of wireless configuration information (e.g., such as a network name) and may await for a selection of one of the wireless configuration information sets by the user. Alternatively, the trusted system 320 may present one of several sets of wireless configuration information based on, for example, a priority associated with each set of wireless configuration information, a frequency of access of each set of wireless configuration information, or another type of wireless configuration information characteristic; the trusted system 320 then obtains user confirmation that the presented set of wireless configuration information is the desired wireless configuration information.

The trusted system 320 sends the accessed wireless configuration information to the wireless device (step 348$h$).

The wireless device 310 receives the wireless configuration information (step 348$wd$) and modifies the configuration information previously stored by the wireless device (step 350$wd$), if necessary and to the extent that such wireless configuration information exists. For example, the wireless device 310 may update a configuration table (or otherwise modify the configuration parameters) with the wireless configuration information received. In some implementations, the wireless device 310 may pull information from the trusted system 320 in addition to or in lieu of the trusted system 320 sending the wireless configuration information in step 348$h$.

When the wireless device 310 modifies the wireless configuration settings, the wireless device 310 then may be capable of establishing communications with the wireless access point 325 (and, hence, the wireless network served by the wireless access point 325) using the received wireless configuration information (step 354$wd$).

Alternatively, after the trusted system 320 obtains an identifier associated with the user of the wireless device 310 and accesses wireless configuration information based on the obtained identifier, the trusted system 320 may coordinate or otherwise enable the configuration of the wireless device, the wireless access point 325, and/or other components of the wireless network served by the wireless access point 325 based on the accessed wireless configuration information.

Figure 4:
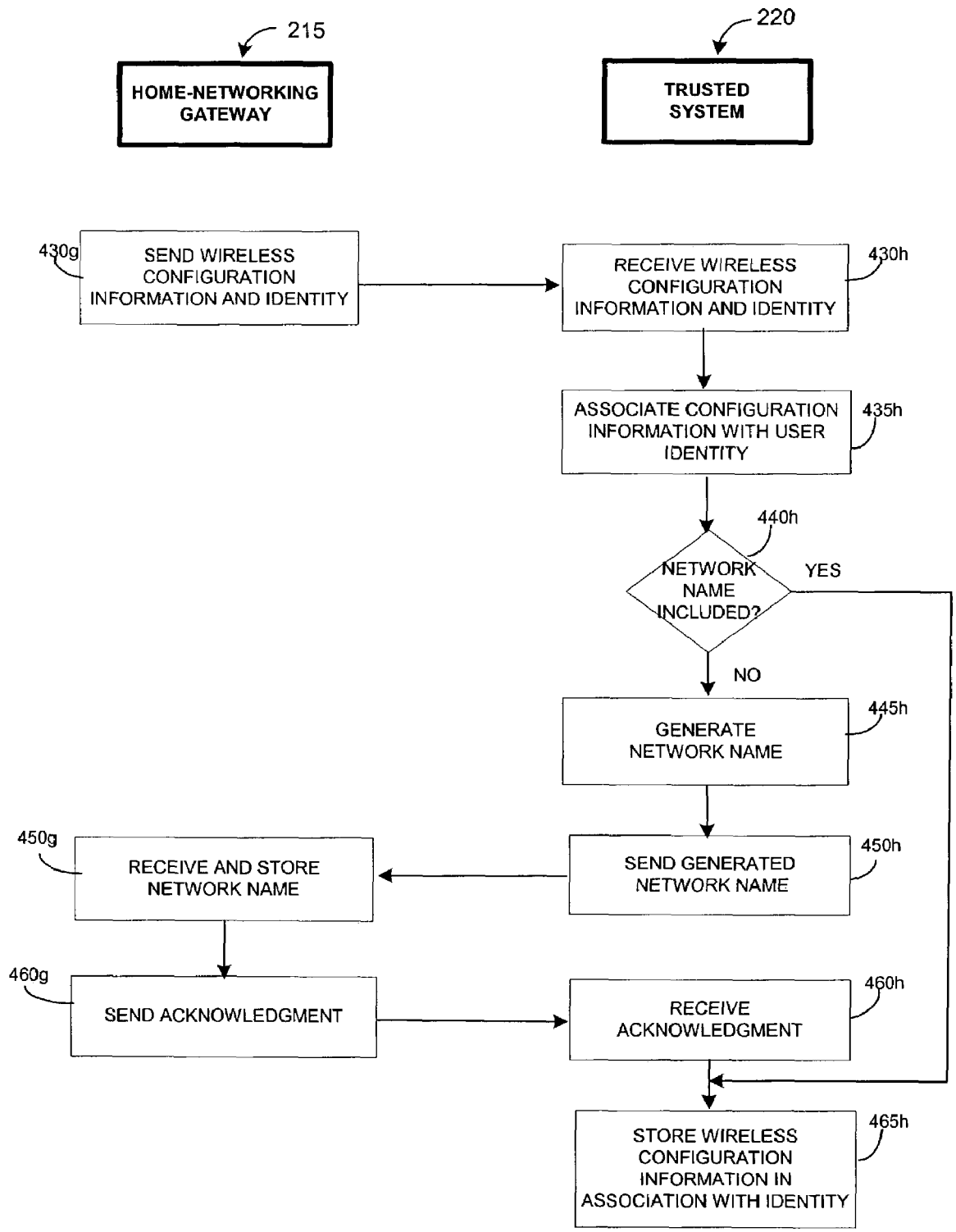
FIG. 4 is a block diagram illustrating exemplary communications between a home-networking gateway and a trusted system to generate and store wireless configuration information.

Using the structure and organization shown by FIG. 2, FIG. 4 depicts a process 400 for communicating between a home-networking gateway 215 and a trusted system 220 to generate and store wireless configuration information. If required during process 400, the trusted system 220 generates a network name.

The process 400 begins when the home-networking gateway 215 sends wireless configuration information and an identity to the trusted system 220 (step 430$g$). The identity may be, for example, a user identity that identifies a user, such as a user name, an account name, a subscriber name, or a master or family account name. The identity also may be a network identifier, such as a SSID. To send wireless configuration information and an identity to the trusted system, the home-networking gateway 215 may access stored wireless configuration information, as described previously with respect to FIG. 2. The wireless configuration information may include, for example, a cryptographic key, a network name (such as a SSID), a list of devices permitted to access the network, and other information needed to configure a device to work on the wireless home network.

Alternatively, the home-networking gateway 215 may not include a network name in the wireless configuration information sent to the trusted system 220. This may occur, for example, when the wireless network has not itself been completely installed or configured, and no network name has been assigned to the wireless network. In such a case, the process 400 includes the generation of a network name based on the identity sent, as described later.

The user identity, for example, may be a user name associated with a user account used to establish a connection between the home-networking gateway 215 and the trusted system 220. Alternatively, the user identity may be a user name that is associated with a device capable of accessing the trusted system 220 using the home-networking gateway.

In some implementations, the user identity may be a user identity that is not associated either with the trusted system 220 or with the home-networking gateway 215. In yet other implementations, a user identity may be selected from among a list of possible user identities. In some implementations, a user identity is not provided at all. Instead, the trusted system 220 uses a user identity that is not provided by the home-networking gateway.

The trusted system 220 receives the wireless configuration information and the user identity (step 430$h$) and associates wireless configuration information with the received user identity. The trusted system 220 may associate the wireless configuration information with a user identity by storing both an identifier for the wireless configuration information and the user or network identity in a table, a list or another type of data structure. Alternatively, the trusted system 220 may associate the wireless configuration information with a user identity by storing both the wireless configuration information and the user, or network, identity in a table, a list, or another type of data structure.

The trusted system 220 determines whether the received wireless configuration information includes a network name, such as an SSID (step 440$h$). If not, the trusted system 220 generates a network name (step 445$h$). This may be accomplished, for example, by generating a network name that is based on the user identity associated with the received wireless configuration information. In some implementations, the trusted system 220 authenticates the received user identity and only generates a network name when an authenticated user identity has been received.

When the trusted system 220 generates a network name (step 345$h$), the trusted system sends the generated network name to the home-networking gateway 215 (step 450$h$). The home-networking gateway 215 receives and stores the network name (step 450$g$). In some implementations, the trusted system 220 may send to the home-networking gateway 215 the received wireless configuration information in addition to the network name.

The home-networking gateway 215 may store the network name in a configuration table (or otherwise modify the configuration parameters) with the received network name.

The home-networking gateway 215 sends to the trusted system 220 an acknowledgment that the network name has been received (step 460$g$). The trusted system 220 receives the acknowledgment (step 460$h$). When the home-networking gateway 215 does not receive an acknowledgment, the home-networking gateway 215 may take one of several actions, such as re-sending the network name to the wireless device 410 or sending an electronic mail message to a user account to notify the user that an acknowledgment was not received. In some implementations, the home-networking gateway 215 may receive or pull information from the trusted system 420 in addition to or in lieu of the trusted system 220 sending the network name in step 450g.

When the trusted system 220 receives an acknowledgment from the home-networking gateway 215, the trusted system stores the wireless configuration information in association with the identity (step 465h).

The techniques and concepts are applicable to home network devices other than a home-networking gateway. For example, a router, a digital hub, a general-purpose computer, or a single-purpose configuration management device may perform the functions described as being performed by the home-networking gateway.

Implementations may include a method or process, an apparatus or system, or computer software on a computer medium. It will be understood that various modifications may be made that still fall within the following claims. For example, advantageous results still could be achieved if steps of the disclosed techniques were performed in a different order and/or if components in the disclosed systems were combined in a different manner and/or replaced or supplemented by other components.

Although the techniques and concepts have been described in which a trusted system stores configuration information and performs a proxy configuration service for a wireless device, a wireless access point, or a home-networking gateway, a trusted system that may not necessarily be in a host-client relationship with the home-networking gateway may be used in place of the described trusted system. Another type of trusted computing device also may be used to perform the described techniques and concepts. For example, a general-purpose computer accessible to the network, such as in a peer-to-peer relationship, or another trusted computer system may be used to perform the functions described as being performed by the trusted system.

Furthermore, although the techniques and concepts have been described in which an identity is associate with a user account that is authenticated and associated with information for a home-networking gateway or other communication device, the user account does not necessarily need to be a subscriber account. The techniques and concepts described with respect to a user account are applicable to a user identity or an user operating a device or a home-networking gateway.

What is claimed is:

1. A method for communicating wireless configuration information to a gateway for a wireless local area network, the method comprising:
   receiving, at a trusted system, wireless configuration information that is associated with a first gateway for a first wireless local area network and that is useful in configuring the first gateway to enable communications between the first gateway and one or more other devices over the first wireless local area network;
   receiving, at the trusted system, an indication that the wireless configuration information is associated with an identity associated with the first wireless local area network;
   storing, on the trusted system, the wireless configuration information and an indication that the wireless configuration information is associated with the identity;
   receiving a request from the identity associated with the first wireless local area network to communicate, to a second gateway for a second wireless local area network, wireless configuration information that is based on the wireless configuration information stored on the trusted system and associated with the first gateway for the first wireless local area network;
   in response to receiving the request from the identity and based on the received indication that the wireless configuration information is associated with the identity, accessing the wireless configuration information stored on the trusted system and associated with the first gateway for the first wireless local area network; and
   downloading wireless configuration information that is based on the wireless configuration information stored on the trusted system and associated with the first gateway for the first wireless local area network to the second gateway for the second wireless local area network to configure the second gateway to enable communications between the second gateway and one or more other devices over the second wireless local area network.

2. The method of claim 1 wherein the devices comprise wireless devices.

3. The method of claim 1 wherein accessing the wireless configuration information stored on the trusted system and associated with the first gateway for the first wireless local area network comprises using an identity received from a storage location that is remote to the devices.

4. The method of claim 1 further comprising:
   authenticating the request from the identity to determine whether the identity is authorized to access the trusted system; and
   accessing the wireless configuration information stored on the trusted system and associated with the first gateway for the first wireless local area network and downloading wireless configuration information only if the received identity is authorized to access the trusted system.

5. The method of claim 4 wherein the trusted system comprises a system provided by an Internet service provider or a system provided by an Internet access provider.

6. The method of claim 1 wherein the wireless configuration information comprises a connectivity parameter.

7. The method of claim 1 wherein the identity comprises a user identity.

8. The method of claim 1 wherein the identity comprises a network identity.

9. The method of claim 8 wherein the network identity comprises one or more of a network name, a service set identifier, a media access control address, or a network address.

10. The method of claim 1 further comprising generating the wireless configuration information based on the identity.

11. The method of claim 10 wherein generating wireless configuration information comprises generating a network identity.

12. The method of claim 10 further comprising storing the generated wireless configuration information.

13. The method of claim 12 wherein storing the generated wireless configuration information comprises storing the generated wireless configuration information at a storage location that is remote to both the devices and the gateways.

14. The method of claim 1 further comprising establishing a communication session between the trusted system and the second gateway for the second wireless network.

15. The method of claim 1 further comprising establishing a communications session between a device and the trusted system through the second gateway for the second wireless network after downloading wireless configuration information to the second gateway for the second wireless local area network.

16. The method of claim 1 wherein the trusted system comprises a system provided by an Internet service provider or a system provided by an Internet access provider.

17. The method of claim 1 wherein the first wireless local area network and the second wireless local area network are available for wireless connectivity concurrently.

18. A computer-readable medium having embodied thereon a computer program configured to communicate wireless configuration information to a gateway for a wireless local area network, the medium comprising one or more code segments configured to:
  receive, at a trusted system, wireless configuration information that is associated with a first gateway for a first wireless local area network and that is useful in configuring the first gateway to enable communications between the first gateway and one or more other devices over the first wireless local area network;
  receive, at the trusted system, an indication that the wireless configuration information is associated with an identity associated with the first wireless local area network;
  store, on the trusted system, the wireless configuration information and an indication that the wireless configuration information is associated with the identity;
  receive a request from the identity associated with the first wireless local area network to communicate, to a second gateway for a second wireless local area network, wireless configuration information that is based on the wireless configuration information stored on the trusted system and associated with the first gateway for the first wireless local area network;
  in response to receiving the request from the identity and based on the received indication that the wireless configuration information is associated with the identity, access the wireless configuration information stored on the trusted system and associated with the first gateway for the first wireless local area network; and
  download wireless configuration information that is based on the wireless configuration information stored on the trusted system and associated with the first gateway for the first wireless local area network to the second gateway for the second wireless local area network to configure the second gateway to enable communications between the second gateway and one or more other devices over the second wireless local area network.

19. The medium of claim 18 wherein the devices comprise wireless devices.

20. The medium of claim 18 wherein the one or more code segments configured to access the wireless configuration information stored on the trusted system and associated with the first gateway for the first wireless local area network comprise one or more code segments configured to use an identity received from a storage location that is remote to the devices.

21. The medium of claim 18 wherein the one or more code segments are further configured to:
  authenticate the request from the identity to determine whether the identity is authorized to access the trusted system; and
  access the wireless configuration information stored on the trusted system and associated with the first gateway for the first wireless local area network and download wireless configuration information only if the received identity is authorized to access the trusted system.

22. The medium of claim 18 wherein the wireless configuration information comprises a connectivity parameter.

23. The medium of claim 18 wherein the identity comprises a user identity.

24. The medium of claim 18 wherein the identity comprises a network identity.

25. The medium of claim 18 wherein the one or more code segments are further configured to generate the wireless configuration information based on the identity.

26. The medium of claim 18 wherein the one or more code segments are further configured to store the generated wireless configuration information.

27. The medium of claim 18 wherein the first wireless local area network and the second wireless local area network are available for wireless connectivity concurrently.

28. A system for communicating wireless configuration information to a gateway for a wireless local area network, the system comprising a processor connected to a storage device and one or more input/output devices, wherein the processor is configured to:
  receive, at a trusted system, wireless configuration information that is associated with a first gateway for a first wireless local area network and that is useful in configuring the first gateway to enable communications between the first gateway and one or more other devices over the first wireless local area network;
  receive, at the trusted system, an indication that the wireless configuration information is associated with an identity associated with the first wireless local area network;
  store, on the trusted system, the wireless configuration information and an indication that the wireless configuration information is associated with the identity;
  receive a request from the identity associated with the first wireless local area network to communicate, to a second gateway for a second wireless local area network, wireless configuration information that is based on the wireless configuration information stored on the trusted system and associated with the first gateway for the first wireless local area network;
  in response to receiving the request from the identity and based on the received indication that the wireless configuration information is associated with the identity, access the wireless configuration information stored on the trusted system and associated with the first gateway for the first wireless local area network; and
  download wireless configuration information that is based on the wireless configuration information stored on the trusted system and associated with the first gateway for the first wireless local area network to the second gateway for the second wireless local area network to configure the second gateway to enable communications between the second gateway and one or more other devices over the second wireless local area network.

29. The system of claim 28 wherein the devices comprise wireless devices.

30. The system of claim 28 wherein the processor configured to access the wireless configuration information stored on the trusted system and associated with the first gateway for the first wireless local area network comprises a processor configured to use an identity received from a storage location that is remote to the devices.

31. The system of claim 28 wherein the processor is further configured to:
  authenticate the request from the identity to determine whether the identity is authorized to access the trusted system; and
  access the wireless configuration information stored on the trusted system and associated with the first gateway for the first wireless local area network and download the accessed wireless configuration information only if the received identity is authorized to access the trusted system.

32. The system of claim 28 wherein the wireless configuration information comprises a connectivity parameter.

33. The system of claim 28 wherein the identity comprises a user identity.

34. The system of claim 28 wherein the identity comprises a network identity.

35. The system of claim 28 wherein the processor is further configured to generate wireless configuration information based on the identity.

36. The system of claim 28 wherein the processor is further configured to store the generated wireless configuration information.

37. The system of claim 36 wherein the first wireless local area network and the second wireless local area network are available for wireless connectivity concurrently.

38. The medium of claim 18 wherein the trusted system comprises a system provided by an Internet service provider or a system provided by an Internet access provider.

39. The medium of claim 25 wherein the one or more code segments configured to generate the wireless configuration information comprise one or more code segments configured to generate a network identity.

40. The system of claim 28 wherein the trusted system comprises a system provided by an Internet service provider or a system provided by an Internet access provider.

41. The system of claim 35 wherein the processor configured to generate wireless configuration information comprises a processor configured to generate a network identity.

42. A method comprising:
  receiving, at a trusted system, an indication of an identity associated with a user of a device and an indication of a location of the device;
  maintaining, on the trusted system, wireless configuration information for a first wireless local area network located at a first location, wherein the wireless configuration information for the first wireless local area network is associated with the identity and useful in configuring the device to enable communications between the device and the first wireless local area network;
  maintaining, on the trusted system, wireless configuration information for a second wireless local area network located at a second location, wherein the wireless configuration information for the second wireless local area network is associated with the identity and is useful in configuring the device to enable communications between the device and the second wireless local area network;
  analyzing the received indication of the location of the device to determine whether the received indication of the location of the device is related to the first location or the second location;
  based on analyzing the received indication of the location of the device, determining if the received indication of the location of the device is related to the first location or the second location;
  selecting appropriate wireless configuration information for the device from among the wireless configuration information for the first wireless local area network and the wireless configuration information for the second wireless local area network based on the received indication of the location of the device, the wireless configuration information for the first wireless local area network being selected based on a determination that the received indication of the location of the device is related to the first location, and the wireless configuration information for the second wireless local area network being selected based on a determination that the received indication of the location of the device is related to the second location; and
  downloading the appropriate wireless configuration information to the device.

43. The method of claim 42 wherein the indication of the location of the device identifies a physical location, the first and second locations are physical locations, and the first and second locations are different.

44. The method of claim 42 wherein the device comprises a wireless device.

45. The method of claim 42 further comprising:
  authenticating the received indication of the identity to determine whether the identity is authorized to access the trusted system; and
  analyzing the received indication of the location and selecting appropriate wireless configuration information for the device only if the received identity is authorized to access the trusted system.

46. The method of claim 45 wherein the trusted system comprises a system provided by an Internet service provider or a system provided by an Internet access provider.

47. The method of claim 42 wherein the wireless configuration information for the first wireless local area network comprises a connectivity parameter, and the wireless configuration information for the second wireless local area network comprises a different connectivity parameter.

48. The method of claim 42 wherein the identity comprises a user identity.

49. The method of claim 42 wherein the identity comprises a network identity.

50. The method of claim 49 wherein the network identity comprises one or more of a network name, a service set identifier, a media access control address, or a network address.

51. The method of claim 42 wherein the trusted system comprises a system provided by an Internet service provider or a system provided by an Internet access provider.

52. A computer-readable medium having embodied thereon a computer program configured to configure a wireless network, the medium comprising one or more code segments configured to:
  receive, at a trusted system, an indication of an identity associated with a user of a device and an indication of a location of the device;
  maintain, on the trusted system, wireless configuration information for a first wireless local area network located at a first location, wherein the configuration information for the first wireless local area network is associated with the identity and useful in configuring the device to enable communications between the device and the first wireless local area network;
  maintain, on the trusted system, wireless configuration information for a second wireless local area network located at a second location, wherein the wireless configuration information for the second wireless local area network is associated with the identity and is useful in configuring the device to enable communications between the device and the second wireless local network;

analyze the received indication of the location of the device to determine whether the received indication of the location of the device is related to the first location or the second location;

determine, based on analyzing the received indication of the location of the device, if the received indication of the location of the device is related to the first location or the second location;

select appropriate wireless configuration information for the device from among the wireless configuration information for the first wireless local area network and the wireless configuration information for the second wireless local area network based on the received indication of the location of the device, the wireless configuration information for the first wireless local area network being selected based on a determination that the received indication of the location of the device is related to the first location, and the wireless configuration information for the second wireless local area network being selected based on a determination that the received indication of the location of the device is related to the second location; and download the appropriate wireless configuration information to the device.

53. The computer readable medium of 52 wherein the indication of the location of the device identifies a physical location, the first and second locations are physical locations, and the first and second locations are different.

54. The computer readable medium of claim 52 wherein the device comprises a wireless device.

55. The computer readable medium of claim 52 wherein the one or more code segments are further configured to:
authenticate the received indication of the identity to determine whether the identity is authorized to access the trusted system; and
analyze the received indication of the location and select appropriate wireless configuration information for the device only if the received identity is authorized to access the trusted system.

56. The computer readable medium of claim 55 wherein the trusted system comprises a system provided by an Internet service provider or a system provided by an Internet access provider.

57. The computer readable medium of claim 52 wherein the wireless configuration information for the first wireless network comprises a connectivity parameter, and the wireless configuration information for the second wireless network comprises a different connectivity parameter.

58. The computer readable medium of claim 52 wherein the identity comprises a user identity.

59. The computer readable medium of claim 52 wherein the identity comprises a network identity.

60. The computer readable medium of claim 59 wherein the network identity comprises one or more of a network name, a service set identifier, a media access control address, or a network address.

61. The computer readable medium of claim 52 wherein the trusted system comprises a system provided by an Internet service provider or a system provided by an Internet access provider.

62. A system comprising a processor connected to a storage device and one or more input/output devices, wherein the processor is configured to:

receive, at a trusted system, an indication of an identity associated with a user of a device and an indication of a location of the device;

maintain, on the trusted system, wireless configuration information for a first wireless local area network located at a first location, wherein the configuration information for the first wireless local area network is associated with the identity and useful in configuring the device to enable communications between the device and the first wireless local area network;

maintain, on the trusted system, wireless configuration information for a second wireless local area network located at a second location, wherein the wireless configuration information for the second wireless local area network is associated with the identity and is useful in configuring the device to enable communications between the device and the second wireless local network;

analyze the received indication of the location of the device to determine whether the received indication of the location of the device is related to the first location or the second location;

determine, based on analyzing the received indication of the location of the device, if the received indication of the location of the device is related to the first location or the second location;

select appropriate wireless configuration information for the device from among the wireless configuration information for the first wireless local area network and the wireless configuration information for the second wireless local area network based on the received indication of the location of the device, the wireless configuration information for the first wireless local area network being selected based on a determination that the received indication of the location of the device is related to the first location, and the wireless configuration information for the second wireless local area network being selected based on a determination that the received indication of the location of the device is related to the second location; and download the appropriate wireless configuration information to the device.

63. The system of 62 wherein the indication of the location of the device identifies a physical location, the first and second locations are physical locations, and the first and second locations are different.

64. The system of claim 62 wherein the device comprises a wireless device.

65. The system of claim 62 wherein the processor is further configured to:
authenticate the received indication of the identity to determine whether the identity is authorized to access the trusted system; and
analyze the received indication of the location and select appropriate wireless configuration information for the device only if the received identity is authorized to access the trusted system.

66. The system of claim 65 wherein the trusted system comprises a system provided by an Internet service provider or a system provided by an Internet access provider.

67. The system of claim 62 wherein the wireless configuration information for the first wireless network comprises a connectivity parameter, and the wireless configuration information for the second wireless network comprises a different connectivity parameter.

68. The system of claim 62 wherein the identity comprises a user identity.

69. The system of claim 62 wherein the identity comprises a network identity.

70. The system of claim 69 wherein the network identity comprises one or more of a network name, a service set identifier, a media access control address, or a network address.

71. The system of claim 62 wherein the trusted system comprises a system provided by an Internet service provider or a system provided by an Internet access provider.

72. The method of claim 1 wherein the wireless configuration information that is based on the wireless configuration information stored on the trusted system and associated with the first gateway for the first wireless local area network is different than the wireless configuration information stored on the trusted system and associated with the first gateway for the first wireless local area network such that downloading the wireless configuration information that is based on the wireless configuration information stored on the trusted system and associated with the first gateway for the first wireless local area network to the second gateway for the second wireless local area network comprises downloading wireless configuration information that is different than the wireless configuration information stored on the trusted system and associated with the first gateway for the first wireless local area network to the second gateway for the second wireless local area network.

73. The method of claim 1 wherein:
receiving a request from the identity to communicate, to a second gateway for a second wireless local area network, wireless configuration information that is based on the wireless configuration information stored on the trusted system and associated with the first gateway for the first wireless local area network comprises receiving a request from the identity to replicate the wireless configuration information stored on the trusted system and associated with the first gateway for the first wireless local area network to the second gateway for the second wireless local area network; and
downloading the wireless configuration information that is based on the wireless configuration information stored on the trusted system and associated with the first gateway for the first wireless local area network to the second gateway for the second wireless local area network comprises downloading the wireless configuration information stored on the trusted system and associated with the first gateway for the first wireless local area network to the second gateway for the second wireless local area network.

74. A method for communicating wireless configuration information to a gateway for a wireless network, the method comprising:
receiving, at a trusted system, wireless configuration information that is associated with a first gateway for a first wireless network and that is useful in configuring the first gateway to enable communications between the first gateway and one or more other devices over the first wireless network;
receiving, at the trusted system, an indication that the wireless configuration information is associated with an identity associated with the first wireless network;
storing, on the trusted system, the wireless configuration information and an indication that the wireless configuration information is associated with the identity;
receiving a request from the identity associated with the first wireless network to communicate, to a second gateway for a second wireless network, wireless configuration information that is based on the wireless configuration information stored on the trusted system and associated with the first gateway for the first wireless network;
in response to receiving the request from the identity and based on the received indication that the wireless configuration information is associated with the identity, accessing the wireless configuration information stored on the trusted system and associated with the first gateway for the first wireless network; and
downloading wireless configuration information that is based on the wireless configuration information stored on the trusted system and associated with the first gateway for the first wireless network to the second gateway for the second wireless network to configure the second gateway to enable communications between the second gateway and one or more other devices over the second wireless network.

75. A method comprising:
receiving, at a trusted system, an indication of an identity associated with a user of a device and an indication of a location of the device;
maintaining, on the trusted system, wireless configuration information for a first wireless network located at a first location, wherein the wireless configuration information for the first wireless network is associated with the identity and useful in configuring the device to enable communications between the device and the first wireless network;
maintaining, on the trusted system, wireless configuration information for a second wireless network located at a second location, wherein the wireless configuration information for the second wireless network is associated with the identity and is useful in configuring the device to enable communications between the device and the second wireless network;
analyzing the received indication of the location of the device to determine whether the received indication of the location of the device is related to the first location or the second location;
based on analyzing the received indication of the location of the device, determining if the received indication of the location of the device is related to the first location or the second location;
selecting appropriate wireless configuration information for the device from among the wireless configuration information for the first wireless network and the wireless configuration information for the second wireless network based on the received indication of the location of the device, the wireless configuration information for the first wireless network being selected based on a determination that the received indication of the location of the device is related to the first location, and the wireless configuration information for the second wireless being selected based on a determination that the received indication of the location of the device is related to the second location; and
downloading the appropriate wireless configuration information to the device.

* * * * *